Jan. 9, 1962     T. B. KEESLING     3,016,076
FRUIT ORIENTATOR AND CORER

Filed May 13, 1957     8 Sheets-Sheet 1

Inventor
Thomas B. Keesling
by Prangley, Clayton & Vogel
Attorneys

Jan. 9, 1962 T. B. KEESLING 3,016,076
FRUIT ORIENTATOR AND CORER
Filed May 13, 1957 8 Sheets-Sheet 4

Inventor
Thomas B. Keesling
by Prangley, Clayton & Vogel
Attorneys Jan. 9, 1962 T. B. KEESLING 3,016,076
FRUIT ORIENTATOR AND CORER
Filed May 13, 1957 8 Sheets-Sheet 5

Inventor
Thomas B. Keesling
by Prangley, Clayton & Vogel
Attorney

Fig. 16

Inventor
Thomas B. Keesling
by Prangley, Clayton & Vogel
Attorneys

Jan. 9, 1962 T. B. KEESLING 3,016,076
FRUIT ORIENTATOR AND CORER
Filed May 13, 1957 8 Sheets-Sheet 8

Fig. 17

Inventor
Thomas B. Keesling
by Prangley, Clayton & Vogel
Attorney

United States Patent Office 3,016,076
Patented Jan. 9, 1962

3,016,076
FRUIT ORIENTATOR AND CORER
Thomas B. Keesling, Los Gatos, Calif., assignor, by mesne assignments, to FMC Corporation, a corporation of Delaware
Filed May 13, 1957, Ser. No. 658,846
15 Claims. (Cl. 146—52)

This invention relates to fruit preparation machines and methods and more particularly to methods and machines for aligning, coring and transferring fruits having two indents such as apples and the like.

It is an important object of the present invention to provide a machine and method for orienting fruits and vegetables having two indents therein.

Another object of the invention is to provide an improved machine and method for locating an indent in indented fruits and vegetables.

Yet another object of the invention is to provide an improved machine for locating indents in fruits and vegetables including a rotating disc which is rotated about a substantially horizontal axis while the axis is simultaneously rotated about the vertical axis.

Still another object of the invention is to provide an improved fruit and vegetable aligning machine in which an indent therein may be located and placed in a predetermined position by an orbiting indent aligning member operable to locate the indent when any portion of the indent lies within the orbiting area of the aligning member.

Yet another object of the invention is to provide a machine and method for aligning fruits and vegetables having two indents therein including a first mechanism to locate one of the indents and a second mechanism thereafter to locate the second indent and to align the two indents in a predetermined position.

Still another object of the invention is to provide an improved mechanism and method for removing cores from fruits and vegetables.

A further object of the invention is to provide an aligning mechanism and method which will align fruits and vegetables having two indents therein with the indents placed in predetermined positions and without injury to the fruit.

A still further object of the invention is to provide an improved coring apparatus and method for coring apples and the like which removes the cores therefrom without bruising or tearing the fruit.

These and other objects of the invention will be better understood from a consideration of the following description when taken in conjunction with the accompanying drawings. In the drawings wherein like reference numerals have been used to designate like parts throughout.

Figure 1:
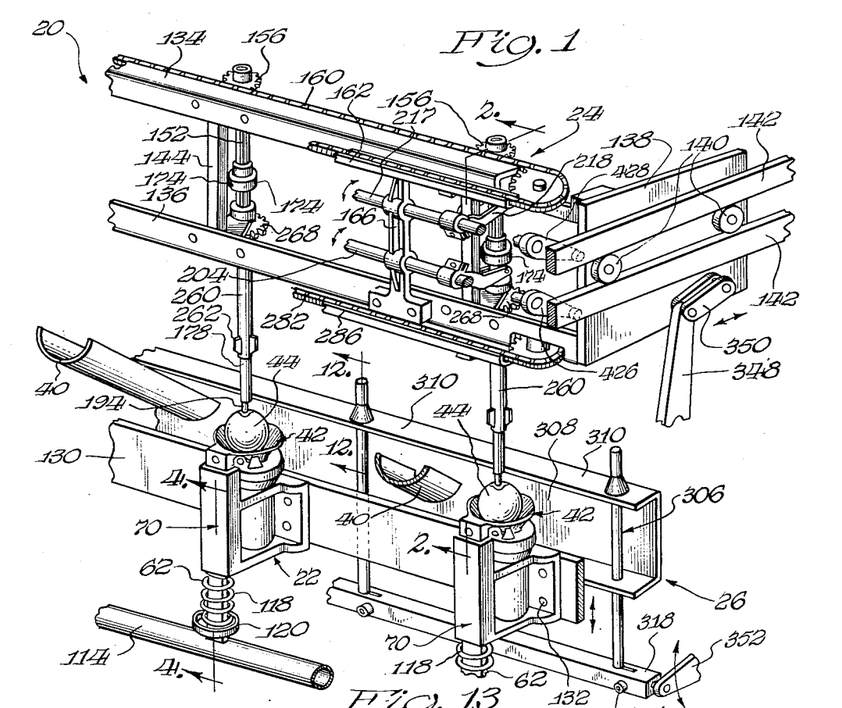
FIGURE 1 is a perspective view with certain parts broken away illustrating the aligning and coring apparatus and method of the present invention.
Figure 16:
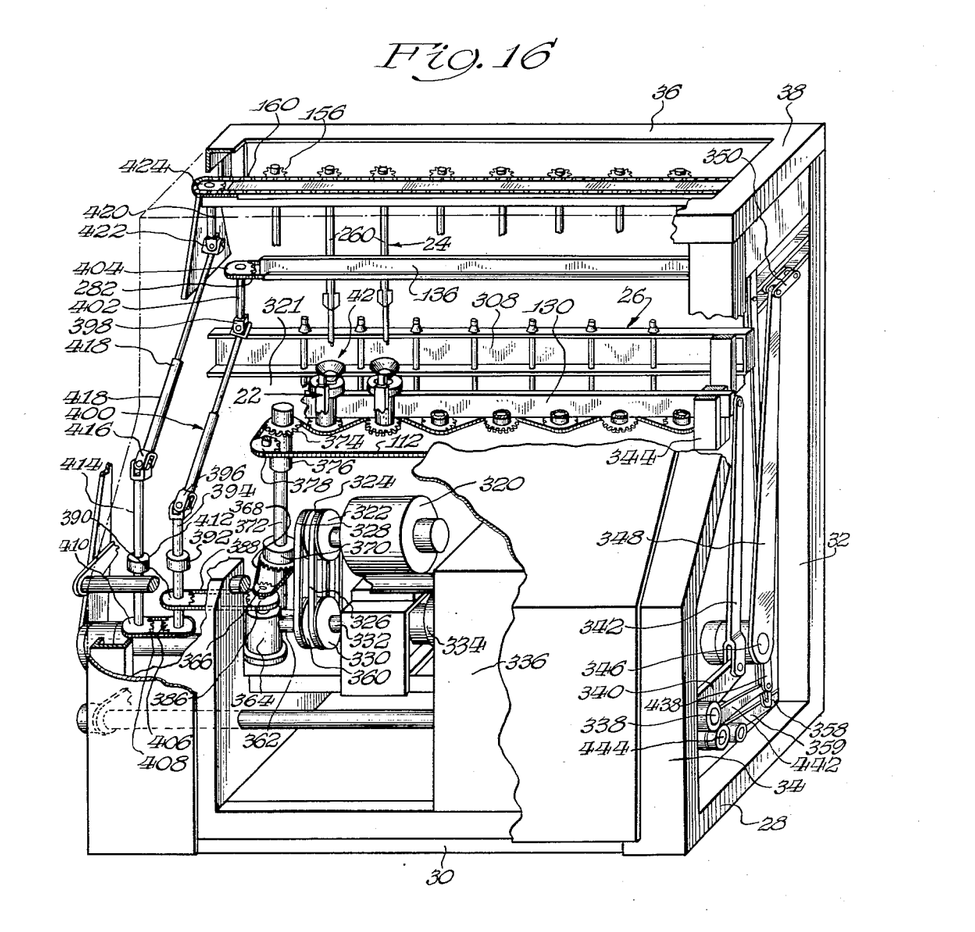
FIGURE 16 is a perspective view with certain portions broken away illustrating particularly the drive mechanism for the machine.

Referring to the drawings and particularly to FIGURES 1 and 16 thereof there is shown an aligning and coring machine for fruits and vegetables having two indents therein such as apples and the like incorporating the principles and features of the present invention. The aligning and coring machine is generally designated by the numeral 20 and includes a first or lower indent finder and aligner generally designated by the numeral 22 and an upper indent finder and aligner and coring tube assembly generally designated by the numeral 24. There also is provided a lower coring assembly generally designated by the numeral 26. These three subassemblies are mounted upon a frame best illustrated in FIGURE 16 of the drawings. The frame includes a pair of transverse frame members 28 connected by a pair of longitudinal frame members 30. Extending upwardly from the intersection of frame members 28 and 30 are end frame members 32 and 34. The upper ends of end members 32 and 34 are in turn interconnected by a pair of longitudinal upper frame members 36 and a pair of transverse frame members 38.

Preferably a plurality of aligning and coring units is provided on machine 20 so that a number of apples such as 7 apples or 10 apples may be simultaneously aligned and cored. Although machine 20 includes a plurality of aligning, coring and associated units, only one set will be described in detail and like reference numerals will be applied to duplicate elements.

A feed chute 40 is provided to convey an apple to each of the aligning units 22. Suitable mechanism (not shown) is provided to insure that only one piece of fruit is fed to each aligning unit 22 at a time.

Figure 4:
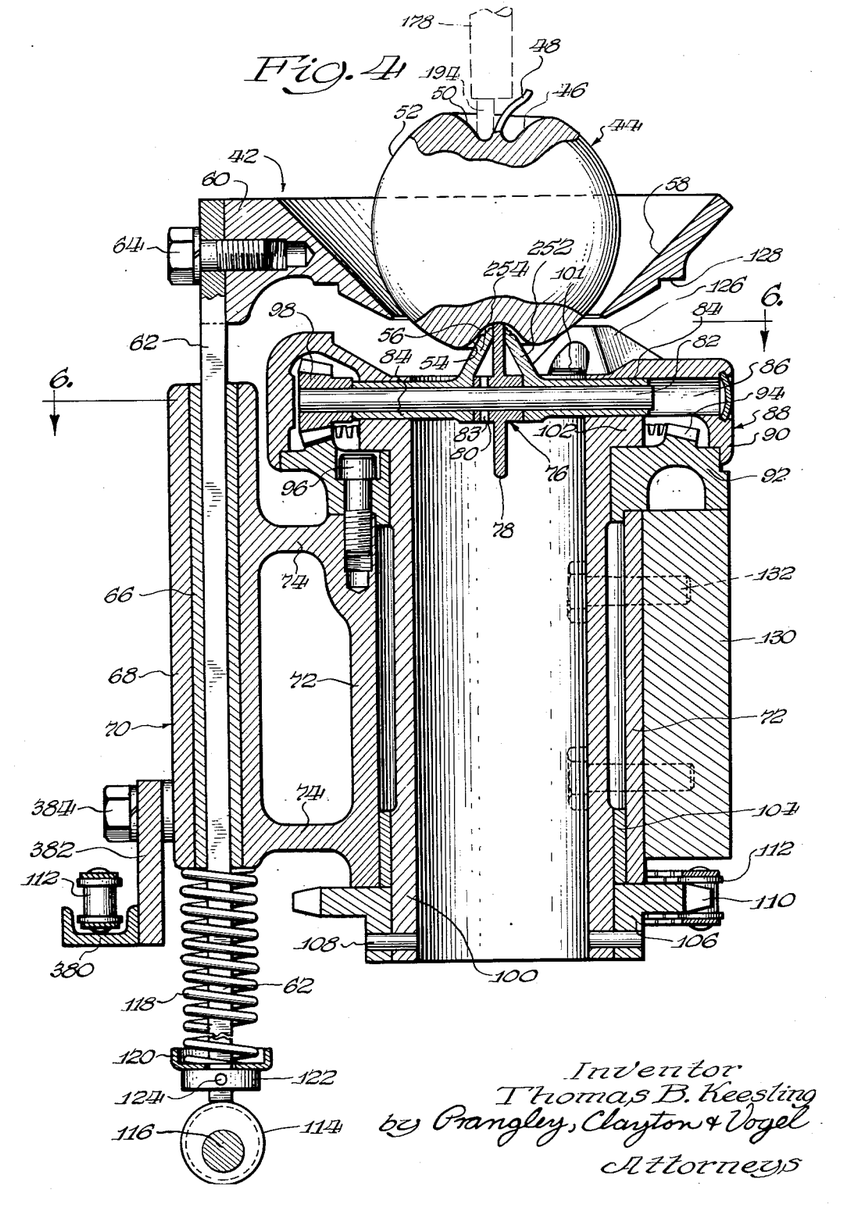
FIGURE 4 is an enlarged view in vertical section through the lower indent finder and aligner substantially as seen in the direction of the arrows along the line 4—4 of FIGURE 1.

Referring particularly to FIGURES 1, 4 and 6 to 8 of the drawings, the construction and operation of aligning unit 22 will be described in detail. A receptacle or cup 42 is provided to receive from chute 40 the fruit to be aligned and cored such as an apple 44. Apple 44 of FIGURE 4 is illustrated as a relatively small apple as contrasted with the large apple illustrated in FIGURE 14 of the drawings. Apple 44 has two separate and distinct indents. One indent of apple 44 is the stem indent or cavity 46 which surrounds the point at which the stem 48 enters apple 44 and includes a generally concavely curved indent surface 50. Although indent surface 50 may be irregularly shaped in most apples and like fruit, there is a well defined surface which by means of the present machine can be distinguished from the general curved apple surface 52. Apple 44 has a second indent or cavity 54 surrounding the remaining fragments of the blossom at the blossom end of the fruit. Blossom indent 54 is also provided with an indent surface 56 generally concavely curved which may be irregular in shape yet can be differentiated from the generally convexly curved surface 52 of apple 44.

Cup 42 is provided with an inner frusto-conical surface 58 to receive and support apple 44 during the location and alignment of one of the indents thereof. Surface 58 preferably has the sides thereof inclined at an angle of 45° with respect to the horizontal end therefore the opposite sides of cup 58 form an included angle of 90°. The most common sizes of apples to be treated on machine 20 are apples having maximum diameters lying between 2¼ inches and 4¾ inches. In aligning fruits in this size range, cup 42 is shaped such that the maximum diameter of surface 58 is 4½ inches and the minimum or lower diameter is 2⅛ inches.

Formed integral with cup 42 is an enlargement 60 to which is secured a stem or rod 62 by means of a bolt 64. Stem 62 has been illustrated as being rectangular in cross section and is received within a complementarily shaped bearing sleeve 66 supported in an encircling extension 68 which is part of a bracket generally designated by the numeral 70. The main portion of bracket 70 is generally cylindrical in shape and is designated by the numeral 72. A pair of web portions 74 interconnects extension 68 and the cylindrical portion 72.

A first indent finder is provided to be used in cooperation with cup 42 to find one indent of the apple 44. More specifically an aligner disc generally designated by the numeral 76 has been provided which when suitably rotated and shifted is capable of locating one of the indents of apple 44. Disc 76 is circular in shape as viewed in FIGURE 7 and when processing apples having diameters lying in the range of 2¼ inches to 4¾ inches preferably has a diaemter of 1½ inches. The thickness of disc 76 is ⅛ inch and the outer edge 78 which contacts the apple 44 is preferably rounded to form an arc having a radius of 3/16 inch. A hub 80 is provided at the center of disc 76 to provide means for supporting disc 76 upon a shaft 82 a pin 83 securing disc 76 to shaft 82. The axis of shaft 82 is disposed substantially perpendicular to the sides of disc 76 with the center of rotation of shaft 82 lying in the center of disc 76. Shaft 82 is rotatably supported in a hollow shaft 84 formed in two sections which are in turn received in a cylindrical opening 86 provided in a gear cover generally designated by the numeral 88. Gear cover 88 includes a downturned flange 90 which is supported by and forms a bearing contact with a ring 92 having a plurality of bevel gear teeth 94 formed on the upper surface thereof and arranged in a circular form. Ring 92 is in turn mounted upon bracket 70 and more specifically the cylindrical portion 72 thereof by three bolts 96. By the above described construction it will be seen that aligner disc 76 is suitably mounted upon bracket 70.

In order to locate the indent of a fruit 44, disc 76 is rotated about a horizontal axis extending through the center thereof and the entire disc while rotating about a horizontal axis is also rotated about a vertical axis lying in a plane bisecting disc 76 as viewed in FIGURE 4.

Rotation of disc 76 about its horizontal axis is obtained by rotating shaft 82. To this end a miter pinion gear 98 is fixedly attached to one end of shaft 82 and is positioned to contact and roll upon the series of teeth 94 provided on ring 92.

Means to rotate aligner disc 76 about a vertical axis is provided in the form of a sleeve 100 on which are mounted the hollow shaft 84 and gear cover 88. The upper end of sleeve 100 is provided with a flange 102 which overlies and rides upon a portion of ring 92. The gear cover 88 is fixedly secured to flange 102 by means of a plurality of cap screws 101, see particularly FIGURE 8 of the drawings. A suitable cylindrical bearing 104 is provided adjacent the lower end of sleeve 100 to form a bearing contact with cylindrical portion 72 of bracket 70 through which sleeve 100 extends. Rotation of sleeve 100 is provided by means of a sprocket 106 attached to the lower end of sleeve 100 as by pins 108. An outwardly extending flange on sprocket 106 is provided with a plurality of teeth 110 which interengage with and are driven by the drive chain 112.

Rotation of sleeve 100 rotates shaft 82 in a horizontal plane about a vertical axis and drives gear 98 around gear 94. This serves to rotate shaft 82 about a horizontal axis whereby also to rotate disc 76 about a horizontal axis and also serves to rotate disc 76 bodily about a vertical axis.

During the finding of the first indent to be found in fruit 44 by means of aligner disc 76, cup 42 is held in an upper position as shown in FIGURE 4. More specifically the lower end of stem 62 rests upon a stop in the form of a cam 114 which is eccentrically mounted upon a shaft 116. By means of the eccentric cam 114, the position of cup 42 above and with respect to disc 76 can be adjusted. A spring 118 under compression is mounted between the lower end of the bracket portion 68 and a cup 120 mounted upon stem 62 by means of a disc 122 held in position thereon by a pin 124. Spring 118 serves continually to urge stem 62 against the adjacent surface of cam 114.

Figure 14:
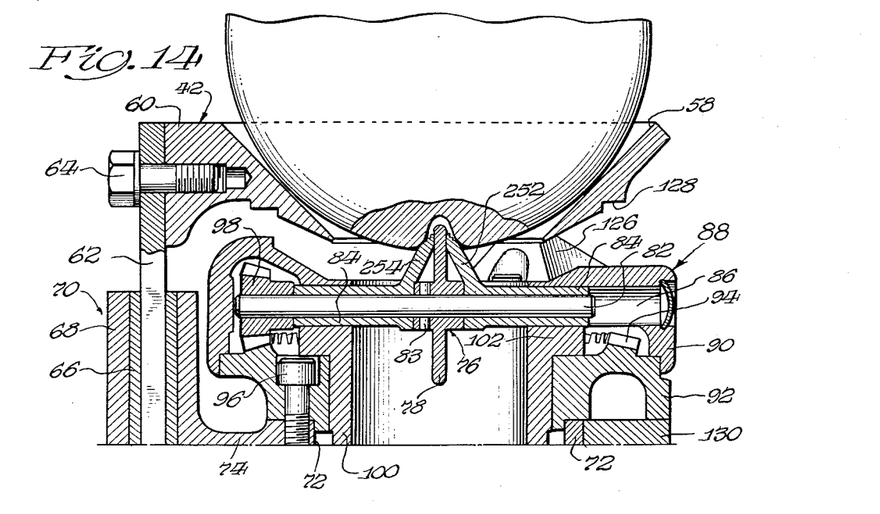
FIGURE 14 is a partial enlarged view in vertical section through the lower indent finder and aligner similar to FIGURE 4 and illustrating the aligning of a large apple.

Cam 114 is adjusted to the position shown in FIGURE 4 of the drawings for relatively small fruit. More specifically cup 42 is adjusted to the highest position relative to disc 76 when the fruit has a maximum diameter of approximately 2¼ inches. When aligning larger fruit such as illustrated in FIGURE 14 of the drawings, cam 114 is adjusted with the low side uppermost contacting stem 62. This places cup 42 in its lowermost position relative to disc 76, this position being illustrated in FIGURE 14 of the drawings. With the parts adjusted in this position apples having a maximum diameter as great as 4¾ inches can be oriented and aligned. Cam 114 is adjusted at intermediate positions when aligning fruit having diameters lying intermediate those illustrated in FIGURES 4 and 14 of the drawings. More dependable aligning is obtained when cam 114 is properly adjusted in accordance with the size of fruit being handled.

Figure 7:
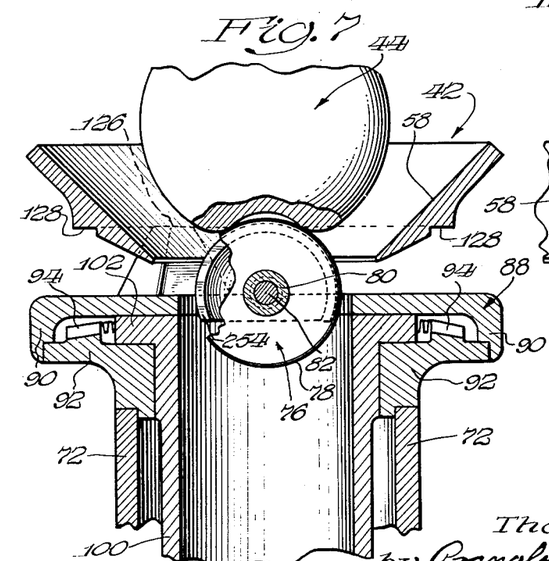
FIGURE 7 is a view in vertical section through the aligning apparatus substantially as seen in the direction of the arrows along the line 7—7 of FIGURE 6.
Figure 8:
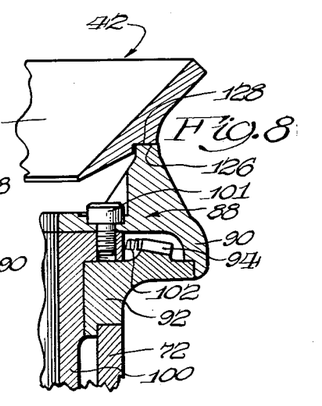
FIGURE 8 is a fragmentary view in vertical section through the aligning cup substantially as seen in the direction of the arrows along the line 8—8 of FIGURE 6.

During certain portions of the operation upon apple 44, the bracket 70 rises vertically and for a portion of its travel moves relatively to cup 42 because of the action of spring 118 urging stem 62 against cam 114. This relative movement continues until a plurality of abutments 126 provided on gear cover 88 come into contact with a shoulder 128 formed on the under surface of cup 42. With the parts in this position as illustrated in FIGURE 7 of the drawings, further upward travel of bracket 70 serves to carry cup 42 therewith.

As has been explained above a plurality of aligning units 22 is provided on machine 20. Each aligning unit is suitably secured to a cup beam 130 by a plurality of bolts 132 (see FIGURE 1). Beam 130 is mounted for vertical movement whereby to cause vertical movement of bracket 70 and the associated parts including aligner disc 76 and cup 42.

Figure 13:
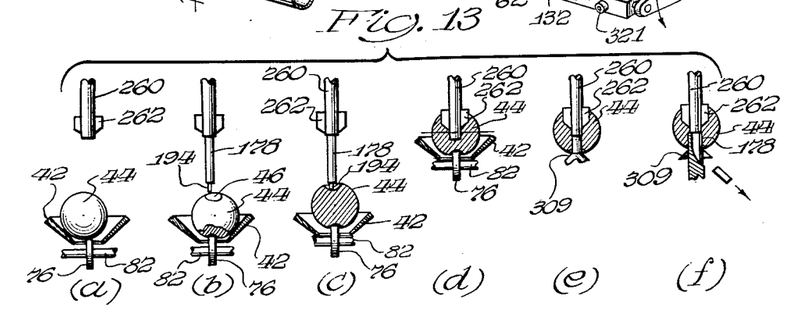
FIGURE 13 is a schematic view illustrating successive steps in operation of the aligning and coring machine of the present invention.

After one of the indents in fruit 44 has been located by disc 76, the fruit 44 stops rotation and rests with the found indent positioned above the outer periphery 78 of disc 76 on shields (to be described hereafter) positioned on either side of disc 76 and with a portion of the outer surface 52 thereof lying against the inclined surface 58 of cup 42. The positions of the various parts at this stage of the operation are schematically illustrated in FIGURES 7 and 13(a). It is now desirable to locate the second indent of fruit 44 and align the axis interconnecting the two indents in a substantially vertical position. To this end a second indent finder is provided above cup 42. The second indent finder forms a part of the aligner and coring assembly generally designated by the numeral 24, the construction and operation of which is best illustrated in FIGURES 1, 2, 3 and 9 to 12 of the drawings. Referring first to FIGURE 1 of the drawings it will be seen that two spindle beams 134 and 136 have been provided, beams 134 and 136 extending substantially parallel to each other and to beam 130 and are disposed in a substantially horizontal position above beam 130. The outermost ends of beams 134 and 136 are connected by plates 138 which are provided with rollers 140 carried by a pair of track members 142. Track members 142 are disposed substantially horizontal and perpendicular to the longitudinal axis of beams 134 and 136 whereby to permit horizontal movement of beams 134—136 and the associated parts mounted thereon.

Figures 2, 3, 12:
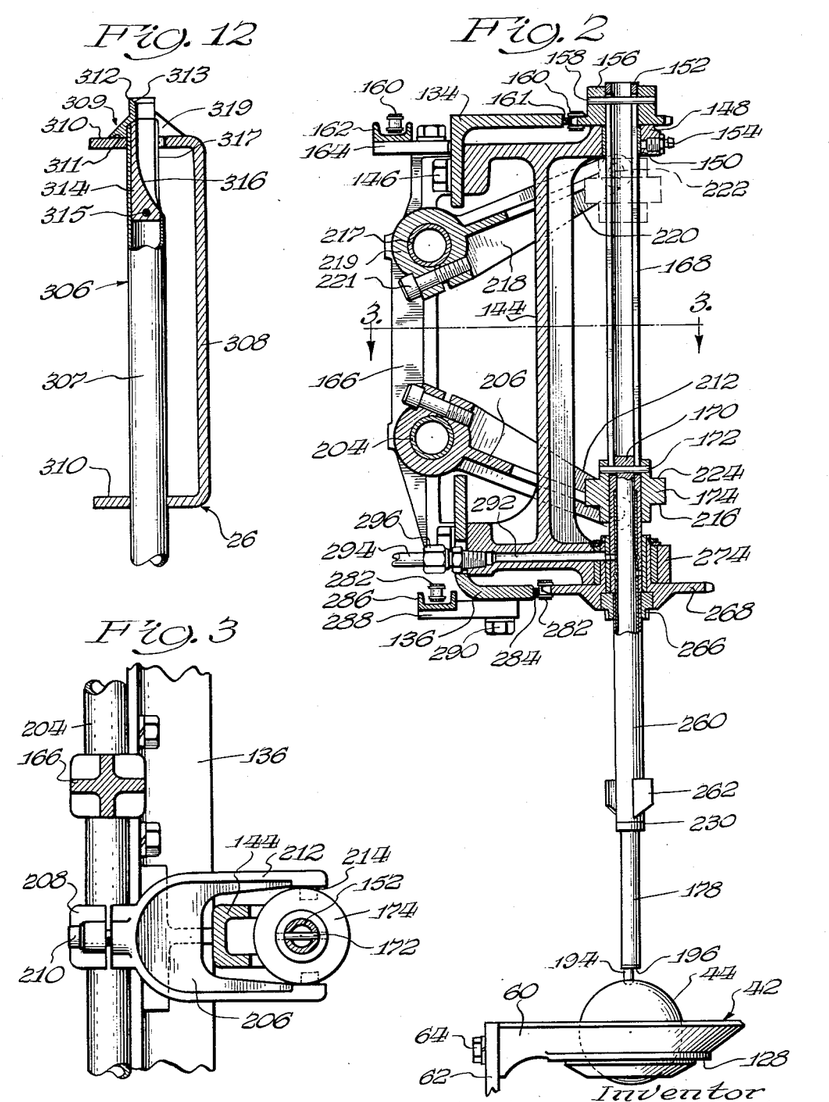
FIGURE 2 is an enlarged view in vertical section through the upper indent aligner and upper coring mechanism illustrated in FIGURE 1, substantially as seen in the direction of the arrows along the line 2—2 of FIGURE 1.
FIGURE 3 is a view in horizontal section through the mechanism in FIGURE 2 substantially as seen in the direction of the arrows along the line 3—3 in FIGURE 2.
FIGURE 12 is an enlarged view in vertical section through the lower corer substantially as seen in the direction of the arrows along the line 12—12 of FIGURE 1.

Referring now to FIGURE 2 of the drawings, it will be seen that there is provided a substantially I-shaped bracket 144 which is suitably secured to beams 134—136 as by bolts 146 and extends vertically therebetween. A first boss 148 is provided on the upper edge of bracket 144 on the side thereof opposite the point of attachment to beam 134. Boss 148 is provided with a bearing sleeve 150 which receives therethrough a tubular shaft 152 which serves to drive the second finder member or wiggler tube as will be described more fully hereinafter. A lubrication fitting 154 is provided so that proper lubrication can be supplied for the upper bearing end of shaft 152.

The upper end of shaft 152 extends above boss 148 and has mounted thereon a sprocket 156 held in position by a pin 158. Sprocket 156 engages a drive chain 160 which is held in proper relationship therewith by means of a shoe 161 mounted on the adjacent edge of beam 134. The return reach of chain 160 travels in a track 162 mounted on a bracket 164 secured in turn to a second bracket 166 mounted also upon beam 134.

There is provided in the sides of tube 152 a pair of diametrically positioned and longitudinally extending slots 168. Extending upwardly into the lower end of tube 152 is a wiggler or aligner shaft 170 which is drivingly interconnected with shaft 152 by means of a pin 172 which extends through an aperture in the upper end of shaft 170 and through the slots 168 (see FIGURE 9 also). A collar 174 also surrounds shaft 152 and receives therein the ends of pin 172 whereby positively to interconnect collar 174 and the wiggler shaft 170.

Figures 5, 9, 10, 11:
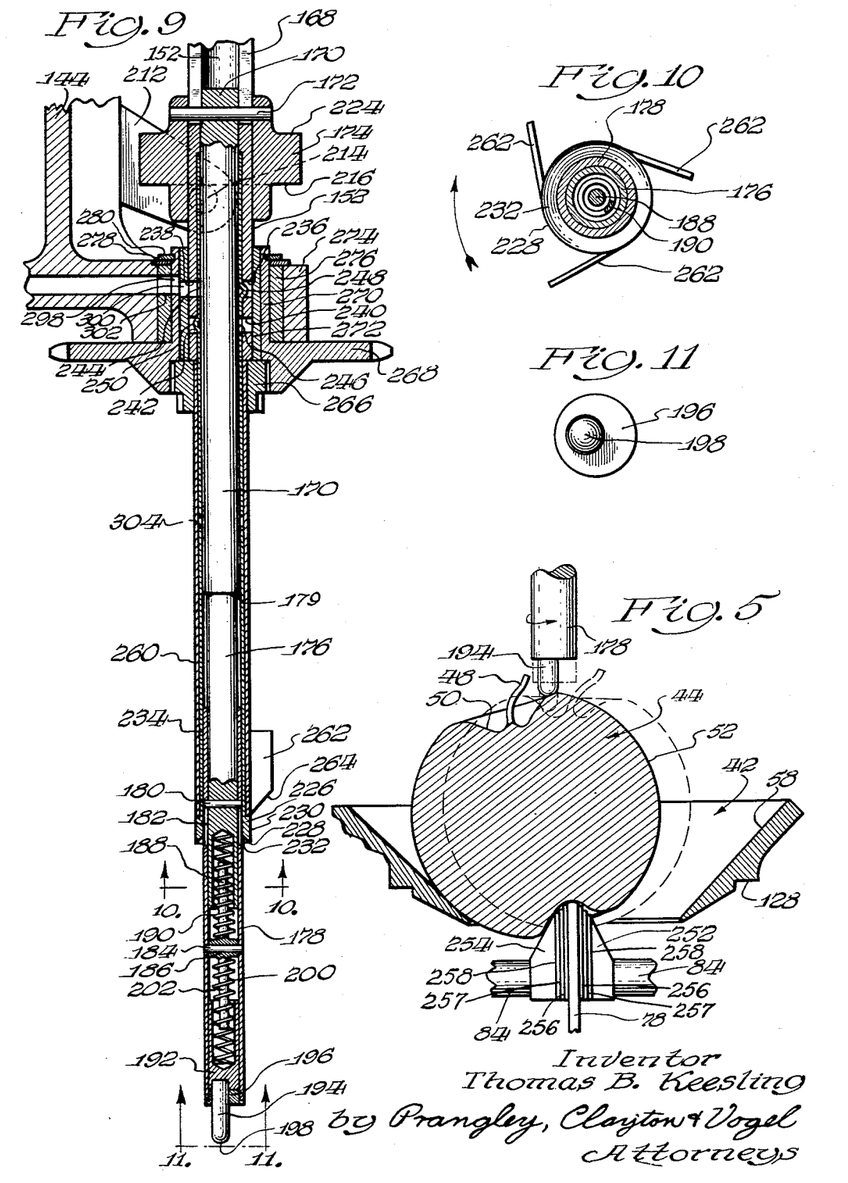
FIGURE 5 is a schematic view illustrating the operation of the upper indent finder and aligner.
FIGURE 9 is a further enlarged view in vertical section through the upper indent finder and aligner and the upper corer.
FIGURE 10 is a further enlarged view through a portion of the mounting structure for the upper indent finder and aligner substantially as seen in the direction of the arrows along the line 10—10 of FIGURE 9.
FIGURE 11 is an enlarged view in elevation of the end of the upper indent finder and aligner substantially as seen in the direction of the arrows along the line 11—11 of FIGURE 9.

The lower end of wiggler shaft 170 has a portion 176 of reduced diameter which carries on the lower end thereof an aligner or wiggler sleeve 178 slidably mounted thereon. The upper end of sleeve 178 terminates at a point spaced below a shoulder 179 formed at the junction of the upper portion of shaft 170 and reduced portion 176. This permits relative movement between sleeve 178 and shaft 170. Driving interconnection between shaft portion 176 and sleeve 178 is provided by a pin 180 extending through a transverse aperture in portion 176 with the ends thereof disposed in a pair of vertically extending and diametrically opposed slots 182 formed in sleeve 178. A second pin 184 serves to interconnect and mount a wiggler or aligner core 186 upon aligner sleeve 178. Extending upwardly from core 186 is a rod 188 which extends into a recess formed in the lower end of shaft portion 176 and is surrounded by a spring 190 which is held under compression between the shaft portion 176 and core 186. Spring 190 serves to urge core 186 and the associated sleeve 178 downwardly away from the adjacent end of shaft portion 176.

There is provided at the lower end of sleeve 178 and disposed therein a center rod 192 which has mounted thereon and extending therefrom a wiggler tip or finger 194 which is mounted with the axis thereof disposed parallel with the axis of shaft 170 but positioned eccentrically with respect thereto. A plug 196 holds rod 192 and the associated tip 194 in operative position within the end of sleeve 178. Tip 194 is free to slide vertically upwardly with respect to plug 196 whereby to move the rounded end 198 thereof upwardly to lie within plug 196. This movement of tip 194 is permitted by the sliding mounting of rod 192 but is opposed by a spring 200 surrounding a small shaft 202 extending downwardly from core 186, spring 200 extending from core 186 downwardly into a recess formed in the upper end of rod 192. Shaft 170, rod 192, tip 194 and plug 196 are preferably formed of aluminum to reduce the weight thereof. By the above described construction a relatively light pressure exerted on the end 198 of tip 194 will serve to move tip 194 upwardly into aligner sleeve 178 and further pressure upon plug 196 will move sleeve 178 upwardly against the action of spring 190.

Rotation of sprocket 156 (see FIGURE 2) serves to rotate shaft 152 which in turn drives the aligner shaft 170 through pin 172. Rotation of shaft 170 in turn through pin 180 drives aligner sleeve 178 which through plug 196 drives tip 194. Because of the eccentric mounting of tip 194 with respect to plug 196, the rounded end 198 of tip 194 moves in a circular path or orbit.

Vertical movement of the upper indent aligner including sleeve 178 and parts mounted thereon can be obtained by moving the collar 174 in a vertical direction whereby to move pin 172 along the slots 168. Referring specifically to FIGURE 3 of the drawings it will be seen that there is mounted upon bracket 166 a hollow shaft 204. Adjustably mounted upon shaft 204 is a lever 206 provided with a clamp 208 providing adjustment between lever 206 and shaft 204 by means of a bolt 210. The outer end of lever 206 is provided with a pair of spaced apart arms 212 which carry on inwardly disposed faces thereof short pins 214 which engage beneath a shoulder 216 formed on the under surface of collar 174 (see FIGURE 9 also). Movement (by mechanism to be described hereinafter) of lever 206 in a vertical direction serves to move collar 174 and the attached parts from the position shown in full lines in FIGURES 2 and 9 upwardly toward a position such as that shown by dotted lines in FIGURE 2.

During certain portions of the fruit processing operation it is desirable forcefully to move or drive shaft 170 downwardly from the position shown in dotted lines in FIGURE 2 substantially to that shown in full lines therein. To this end a second hollow shaft 217 is mounted in bracket 166 and has mounted thereon a lever 218.

One end of lever 218 is provided with a clamp 219 which is adjustable by means of a bolt 221 whereby to permit adjustment of the position of lever 218 upon shaft 217. The outer end of lever 218 carries a pair of spaced apart arms 220 which carry on inwardly disposed faces thereof pins 222. Pins 222 are positioned to engage an upper shoulder 224 provided on collar 174. Rotation of shaft 217 in a clockwise direction as viewed in FIGURE 2 serves to move lever 218 downwardly whereby to drive shaft 170 and associated parts downwardly toward the position shown in full lines in FIGURE 2.

It is to be noted that the connections of levers 206 and 218 with collar 174 permit shaft 152 and all the associated parts thereof including collar 174 to be continually rotated while collar 174 and the associated parts are moved in a vertical direction.

After both indents of apple 44 have been found and the axis interconnecting the two indents has been aligned in a vertical direction between disc 76 and the aligner tip 194, it is desired to remove the core from the apple. The first portion of the coring operation is accomplished by means of a coring cutter generally designated by the numeral 226 (see particularly FIGURE 9 of the drawings). The lower edge of cutter 226 is provided with a cutting edge 228 defined by an outer cylindrical surface 230 which meets with an inner frusto-conical surface 232. The cutter 226 is formed integral with a coring tube 234 which extends upwardly therefrom and surrounds a portion of sleeve 178 and a portion of the shaft 170. The upper end of the coring tube 234 also extends upwardly into a recess formed in the lower end of the tubular shaft 152 and is drivingly connected therewith. The lower end of shaft 152 is provided with a first upper pair of aligned apertures 236 and 238. A second pair of aligned apertures is provided below the first pair as at 240 and 242. A pair of apertures 244 and 246 is provided in coring tube 234 in general alignment with apertures 238 and 240, respectively. A tool can be inserted through aligned apertures 238 and 244 to deform a portion of the coring tube 234 as at 248 into aperture 236 whereby to provide a connection between coring tube 234 and tubular shaft 152. A similar projection 250 can be likewise formed extending into aperture 242. Projections 248 and 250 thereby provide positive driving connection between the tubular shaft 152 and the coring tube 234.

In the operation of the coring cutter 226 the bracket 70 carrying an aligned apple 44 is raised. Tip 194 is still in contact with apple 44 and in conjunction with disc 76 maintains apple 44 in the aligned position. Tip 194 and the associated parts including sleeve 176 are rotating. Simultaneous with the raising of bracket 70, cutter 226 is continuously rotated to form a draw cut about the core of the apple upon coming in contact therewith. By rotating cutter 226 any stems which may lie in the path of the cutting edge 228 are cut through cleanly and are not pushed into the apple. These cut stems drop free since they are not imbedded in the apple and therefore do not interfere with subsequent processing operations.

Figure 6:
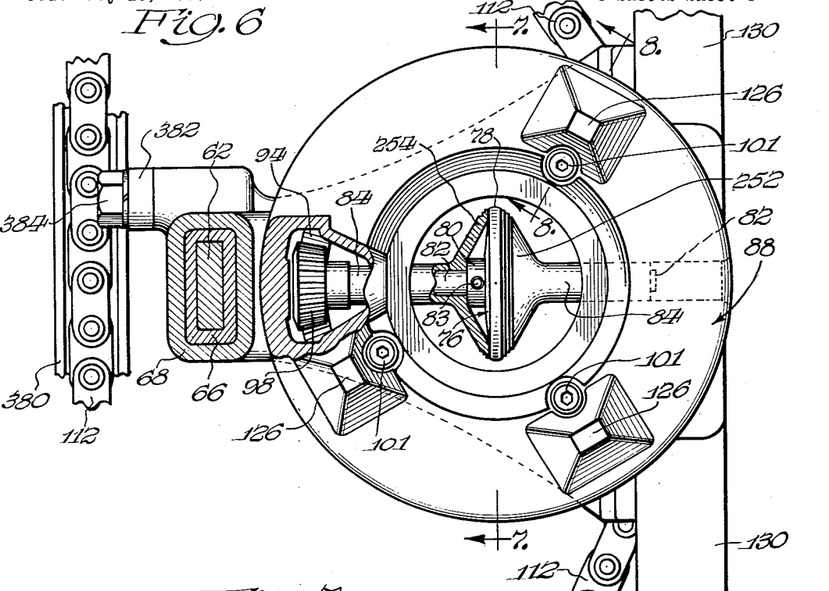
FIGURE 6 is a view in horizontal section through the lower indent finder and aligner substantially as seen in the direction of the arrows along the line 6—6 of FIGURE 4.

In order to insure indent position retention during continued rotation of the wheel and the orbiting of the tip and subsequently to prevent rotation of the apple 44 during the coring cut, a pair of part-circular shields 252 and 254 is provided about aligner disc 76 (see particularly FIGURES 4, 6 and 7). More specifically the shields 252 and 254 are mounted upon the hollow shaft sections 84 and are formed integral therewith. The circumferential extent of shields 252 and 254 is slightly more than 180° as may be best seen in FIGURE 7 of the drawings to insure that the apple rests thereon. A plurality of ridges 256, 257 and 258 is provided about the circumference of shields 252 and 254, respectively, to increase the effectiveness of the contact between apple 44 and shields 252—254. In a preferred construction for aligning apples in the size range set forth above the largest and outermost ridge 256 has a diameter of 1⁷⁄₁₆ inches, the second ridge 257 has a diameter of 1⅜ inches and the third ridge 258 a diameter of 1⁵⁄₁₆ inches. The width of each ridge is 1⁄₃₂ inch.

There is also provided about the coring tube 234 an outer tube 260 which extends upwardly to a point spaced slightly below the lowermost end of shaft 152. The lower end of tube 260 extends to a point spaced slightly above a shoulder formed on the coring cutter 226. Mounted on outer tube 260 are three fins 262 which are disposed substantially tangentially thereto and equally spaced therearound. The lower edge of each fin 262 is bevelled as at 264 to provide an edge directed downwardly and inwardly toward the outer tube 260. Edge 264 is sufficiently thin and sharp to enter the flesh of the fruit when pressed thereagainst.

Disposition of the fins 262 tangentially with respect to outer tube 260 eliminates splitting of brittle fruit during the handling thereof. Rotation of tube 260 during subsequent operations on the fruit is in a clockwise direction as indicated by the arrows in FIGURE 10. Fins 262 are in a sense rotated into the fruit. Any resistance to rotation of the fruit in combination with the rotating force applied by fins 262 tends to compress the fruit at the outer ends of fins 262. This disposition of fins 262 therefore positively resists splitting whereby to eliminate splitting.

When the fins 262 are inserted into a fruit such as apple 44, they can serve as a transfer and driving member therefor. To this end, the upper end of outer shaft 260 is provided with a drive member 266 fixedly attached thereto and in turn fixedly attached to a drive sprocket 268. Sprocket 268 includes a hub 270 extending upwardly about the lower end of shaft 152 and spaced therebetween is a bearing sleeve 272. Hub 270 also is received within a lower boss 274 on bracket 144 and a bearing sleeve 276 is provided therebetween. A sealing member 278 is provided above bearing sleeve 276 and is held in position by a retainer ring 280. Referring specifically to FIGURE 2 of the drawings it will be seen that sprocket 268 engages and is driven by a chain 282 which is held in position thereagainst by a shoe 284 mounted on beam 136. The return reach of chain 282 travels in a track 286 supported by a bracket 288 mounted by means of bolts 290 on beam 136. Movement of chain 282 serves to drive sprocket 268 which in turn drives the outer tube 260 and the attached fins 262.

During the coring operation the fruit juices and certain debris from the meat and core are deposited upon the various operating parts including the sleeve 178, the wiggler tip 194, and coring tube 234 and the coring cutter 226. In order to remove and prevent accumulation of the juices and debris and further to provide lubrication for the moving parts means is provided to wash these parts with water during operation. There is provided in bracket 144 a passage 292 which is suitably connected to a source of water (not shown) through a pipe 294 by means of a coupling 296. Passage 292 in turn communicates with apertures 298, 300 and 302 in hub 270, bearing sleeve 272 and bearing sleeve 276, respectively (see FIGURE 9, also). Water thereby gains access to the outer surface of the coring tube 234 and can flow downwardly along the outer surface thereof and along the inner surface of shaft 152 and outer tube 260. A plurality of access holes 304 is provided along the length of the coring tube 234 so that the water can pass therethrough and along the outer surface of sleeve 178. The water serves to remove and prevent accumulation of fruit juices and debris during operation and also provides lubrication for the relatively moving parts.

The coring cutter 226 during the cutting operation moves through the flesh of a fruit such as apple 44 and around the core thereof to a point substantially below the center of the longitudinal extent of the fruit core. This is diagrammatically illustrated in FIGURE 13(d) of the drawings. During this coring operation, the wiggler or aligner tip 194 is forced upwardly into tube 234 by contact with the upwardly moving apple. Cup beam 130 is raised upwardly whereby to raise the fruit 44 and force the core cutter 226 into the fruit 44 while it is held from turning with respect to bracket 70 and cup 42 by means of the shields 252 and 254. During the upward coring movement of fruit 44, the fins 262 enter the apple whereby to provide a transfer mechanism for later movement of the fruit.

When the coring stroke of cutter 226 has been completed, bracket 70 and cup 42 are lowered and the beams 134 and 136 are moved laterally whereby to carry the outer tube 260 with apple 44 impaled thereon in a substantially horizontal direction. The apple 44 is moved until it is positioned above the lower coring tube (see FIGURE 1). A plurality of lower coring members 306 is provided, a coring member 306 being provided for each of the aligner units 22. Coring members 306 are adjustably mounted for vertical adjustment upon a coring tube clamp bar 318. More specifically bar 318 is provided with a plurality of slotted apertures therein to receive the lower ends of coring members 306. A screw 321 is provided to tighten and adjustably grip coring members 306 in an adjusted position with respect to clamp bar 318. Each coring member 306 includes a tube 307 which extends through aligned apertures in flanges 310 of a beam 308 and is provided with a cutting head generally designated by the numeral 309 (see FIGURE 12 also). Cutting head 309 is firmly secured to the upper end of tube 307 for rotation therewith and includes an outwardly extending shoulder 311. The upper end of cutting head 309 is provided with a cutting edge 312 having an inwardly bevelled surface 313. A core deflector 314 is also mounted in tube 307 by means of a pin 315. Deflector 314 is provided with a curved surface 316 which serves to direct cores outwardly through an aperture 317 in tube 307 and an open side 319 of the cutter head 309.

When a partially cored fruit 44 is in position above the lower coring member 306, the clamp bar 318 is raised and the associated cutting heads 309 engage the fruit whereby to make a draw cut about the lower indent of the fruit and to complete coring thereof as the impaling spindle 260 is rotated. When the coring cutter 309 has completed its coring cut, the lever 218 is moved downwardly in a clockwise direction as viewed in FIGURE 2 of the drawings whereby to move the aligner sleeve 178 and associated parts downwardly. This movement pushes the severed core downwardly against the surface 316 of the core deflector 314 whereby to eject the core from the fruit 44 and the coring mechanism.

Clamp bar 318 is then lowered and the cored fruit is moved to the next processing stage (not shown). When processing of the fruit has been completed, it is removed from the outer tube 260 and the fins 262 at which time the beams 134—136 are moved back to a position above cup 42.

The drive for the various parts is derived from a motor 320 mounted on the frame of machine 20 (see FIGURE 16 of the drawings). The output shaft of motor 320 is provided with two pulleys 322 and 324, each of which is provided with a drive belt 326 and 328, respectively. Drive belt 326 in turn drives a pulley 330 mounted on the shaft 332 of a gear reducer 334. The output of gear reducer 334 is fed to a cam box 336 which contains suitable timing and actuating cams to drive the various drive shafts.

One of the outputs from cam box 336 appears on a cup beam shaft 338 which extends to both sides of machine 20. It is to be understood that the actuated mechanism to be described here and driven by shaft 338 is duplicated at each end of the machine but only one set of driving linkages will be described in detail. Fixedly mounted on the end of shaft 338 is a lever 340 which in turn has pivotally connected thereto an upwardly extending linkage 342. The upper end of linkage 342 is pivotally connected to cup beam 130. Cup beam 130 is mounted on vertically disposed tracks 344 for vertical reciprocating movement therealong. At the proper time as determined by operating cams in cam box 336, shaft 338 is turned in a counterclockwise direction whereby to move linkages 342 and the attached cup beam 130 vertically upwardly at a predetermined rate and through a predetermined distance. At a predetermined later time cup beam 130 is lowered by a clockwise movement of shaft 338.

Another output from the cam box 336 appears on a spindle carriage shaft 346 which also extends to both ends of the machine frame. Affixed to each end of shaft 346 is a lever 348 which extends upwardly therefrom and is connected by a pair of links 350 to plate 138 which together with beams 134 and 136 forms the aligner and coring assembly spindle carriage. As has been explained before (see FIGURE 1, also) a plurality of rollers 140 mounted on plates 138 mount the spindle carriage for movement in a horizontal direction upon tracks 142. Clockwise movement of shaft 346 causes the spindle carriage and associated parts to move to the rear away from the vertical plane of cup beam 130 as viewed in FIGURE 16. Counterclockwise movement of shaft 346 conversely causes movement of the spindle carriage toward cup beam 130 so that in the position illustrated in FIGURES 1 and 16 of the drawings the aligning and coring assembly 24 is positioned above the associated aligning cup 42. Suitably shaped cams in box 336 cause rotation of shaft 346 in the proper direction at the proper rate and at a predetermined time.

Still another output from the cam box 336 serves to move the coring tube clamp bar 318 vertically to effect a part of the coring. More specifically each end of clamp bar 318 is attached to a lever 352 (see FIGURE 1). Levers 352 in turn are fixedly mounted on a shaft 353 (see FIGURE 17). Another lever 354 is fixed mounted on shaft 353 and is connected by a link 355 to a lever 356. Lever 356 is fixedly mounted on a pivot shaft 357 which also carries a cam 358. Cam 358 is actuated by a roller attached to a lever 359, the roller riding in a slot 361 in cam 358. Lever 359 is driven from the cam box 336 in proper timed relationship with the operation of other parts of the machine.

Figure 17:
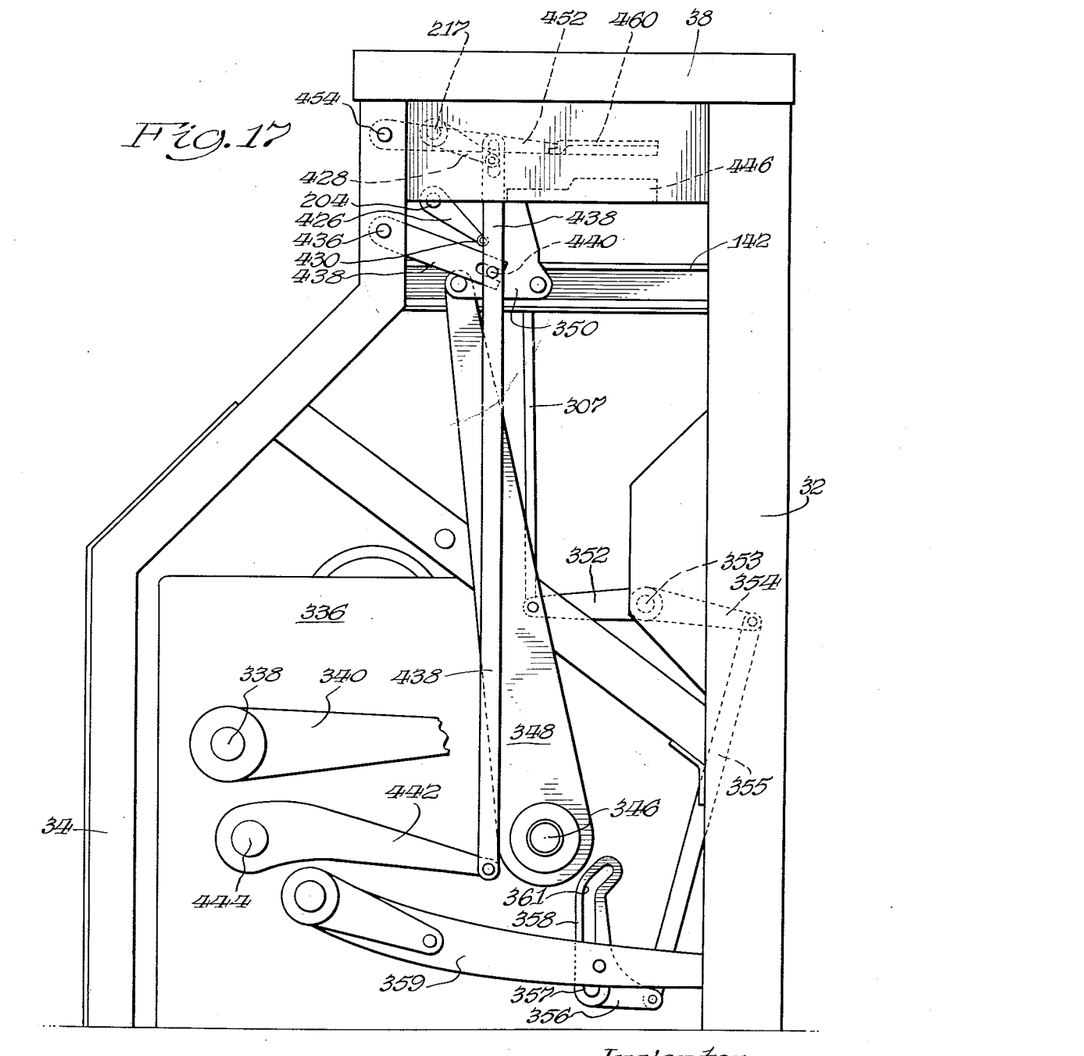
FIGURE 17 is an end elevational view of the right hand end of the machine as viewed in FIGURE 16.

During the aligning and the initial coring operations of machine 20, clamp bar 318 is held in the lower position as illustrated in FIGURES 1 and 17 of the drawings. When it is desired to complete the coring operation by means of the lower corers 306, bar 318 is moved upwardly by moving lever 359 upwardly or in a counterclockwise direction as viewed in FIGURE 17. This serves to move bar 318 and associated corers 306 upwardly into operative position with respect to the fruit 44 as is diagrammatically illustrated in FIGURES 13(e) and 13(f).

The output from motor 320 appearing on belt 328 serves to drive a pulley 360 mounted on the driving shaft 362 of an angle gear reducer 364. The output shaft of reducer 364 has mounted thereon a first sprocket wheel 366 which engages and drives a chain 368 which in turn drives the driven member of an aligning clutch 370. When clutch 370 is engaged, it serves to rotate the output shaft 372 thereof which is connected to a sprocket 374 by a means of a spline connection generally designated by the numeral 376. Sprocket 374 is mounted upon and adapted to move with cup beam 130. The sprocket 374 drives chain 112 described above (see also FIGURES 4 and 6 of the drawings) which engages and drives the sprockets 106 which cause rotation and revolving of the aligning discs 76. It can be seen from FIGURE 16 that chain 112 is threaded through the various sprockets 106 whereby to contact opposite sides of adjacent sprockets. A pair of idler sprockets 378 (one only being shown) is provided to guide chain 112 into a track 380 provided for the return reach thereof. Track 380 is mounted by a means of a bracket 382 and a plurality of bolts 384 on the brackets 70 (see particularly FIGURES 4 and 6 of the drawings).

The spline connection 376 permits lowering and raising of the cup beam 130 and the drive sprocket 374 while preserving connection with the shaft 372. Although shaft 372 is not driven during movement of cup beam 130, this arrangement insures that proper connection is made when it is desired to drive the aligning discs 76.

Another output from angle reducer 364 appears on a second sprocket 386 mounted on the output shaft thereof and drivingly engaging a chain 388. Chain 388 in turn engages a sprocket 390 which drives the driven member of a clutch 392 controlling rotation of the outer tube 260 and the associated fins 262 (see FIGURE 9 of the drawings, also). When clutch 392 is engaged the output therefrom appears on a shaft 394 connected with a universal joint 396. Universal joint 396 is connected to a second universal joint 398 by means of a spline connection generally designated by the numeral 400. Universal joint 398 is in turn connected to a shaft 402 which drives a sprocket 404 mounted upon the spindle carriage and particularly beam 136 thereof. The universal joints 396 and 398 together with the spline connection 400 provide a driving connection for sprocket 404 although the spindle carriage including beam 136 is moved horizontally during operation. Chain 282 described above (see FIGURES 1 and 2, also) is driven by sprocket 404 and chain 282 in turn drives the sprockets 268 fixedly attached to the tubular shafts 260 andd rives the associated fins 262.

Sprocket 390 also serves to drive a sprocket 406 which in turn drives a chain 408. Chain 408 engages and drives a sprocket 410 providing a driving input for an upper aligning and coring clutch 412. The output of clutch 412 appears on the shaft 414 which drives a universal joint 416. A spline connector generally designated by the numeral 418 in turn drives a shaft 420 through a second universal joint 422. Mounted on and driven by shaft 420 is a sprocket 424 which drives chain 160 described above (see FIGURES 1 and 2, also). Chain 160 in turn drives the sprockets 156 and through tube 152 serves to rotate shaft 170 and the attached wiggler tip 194 to effect finding and alignment of the upper indent. The universal joints 416 and 422 togehter with the spline connection 418 maintain the driving connection between clutch 412 and chain 160 although the spindle carriage reciprocates in a horizontal direction as has been explained above during the coring operation.

The apparatus for driving and controlling the motions of shafts 204 and 217 (see FIGURES 1, 2, 15 and 17) will be described. Shaft 204 has fixedly mounted on one end thereof a lever 426. Shaft 217 has a similar lever 428 also attached on one end thereof. The outer ends of levers 426 and 428 are provided with rollers 430 and 432, respectively (see FIGURE 15 also).

Figure 15:
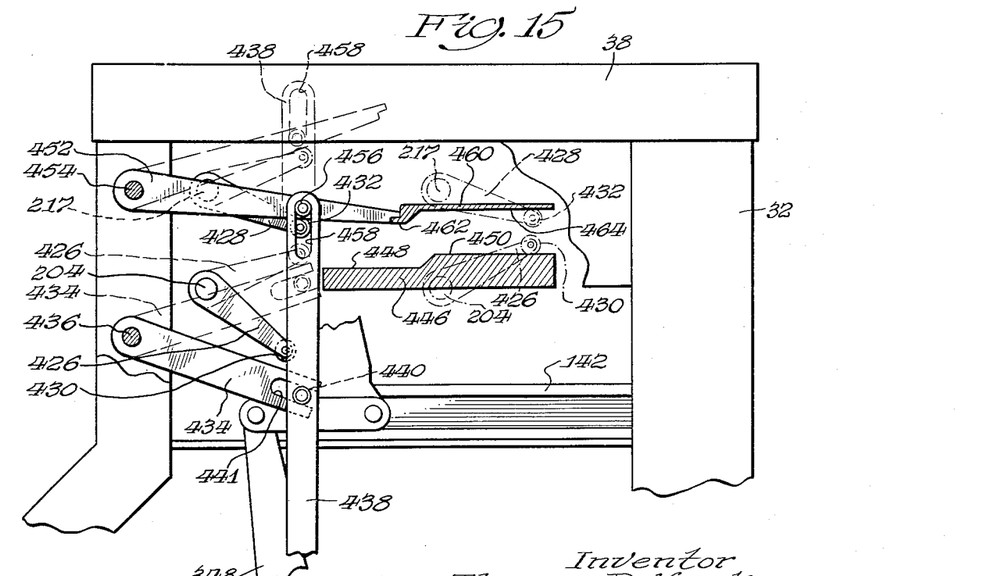
FIGURE 15 is a partial end view with certain parts broken away illustrating the drive and control mechanism for the upper indent finder and the upper corer.

Lifting of the upper indent aligner and corer when the carriage is in the forward or aligning position as illustrated in FIGURE 1 of the drawings and by the solid line parts in FIGURE 15 of the drawings is controlled by shaft 204 and will be described first with special reference to FIGURE 15 of the drawings. The roller 430 on lever 428 normally rides upon and has the position thereof controlled by contact with a pivoted cam 434. More specifically cam 434 is pivoted on the machine frame about a shaft 436 and is movable from a lowermost position illustrated by solid lines in FIGURE 15 to an uppermost position illustrated by dashed lines in FIGURE 15. Movement of cam 434 causes rotation of shaft 204 whereby to raise and lower the upper indent aligner. When cam 434 is in the lowermost position as viewed in FIGURE 15, the aligner is in the lowermost position. When cam 434 is in the dashed position or uppermost position, the aligner is in the lifted or retracted position.

The position of cam 434 is controlled by a link 438 which carries a roller 440 engageable in a U-shaped slot 441 formed in the end of cam 434. The lower end of link 438 is attached to a lever 442 mounted on a shaft 444. Shaft 444 is one of the outputs from cam box 336 and is moved in proper timed relationship to the other mechanisms of the machine by the mechanism within the cam box 336.

Rotation of lever 442 in a counterclockwise direction raises link 438 and moves cam 434 into engagement with roller 430. Continued upward movement of link 438 rotates lever 426 and the attached shaft 204 in a counterclockwise direction as viewed in FIGURE 15 to raise the aligner assembly.

It is desirable to hold the aligner assembly in the raised position when the carriage is moved to the rear or coring position. To this end a stationary cam 446 is provided having a first or lower support surface 448 and a second or higher support surface 450. Roller 430 on lever 426 passes from the upper surface of cam 434 onto cam surface 448 as the carriage is moved from the forward toward the rear position.

Lowering of shaft 170 and the associated aligning parts is controlled by rotation of shaft 217 which is in turn controlled by movement of lever 428. The position of lever 428 when the carriage is in the forward or aligning position is controlled by a lever 452 pivoted to the frame about shaft 454. More specifically roller 432 on lever 428 contacts the lower side of lever 452. When the parts are in the position illustrated in solid lines in FIGURE 15, the shaft 170 is forced downwardly. Shaft 170 and associated parts including levers 428 and 452 can be raised to the positions indicated by dashed lines.

Downward movement of lever 452 is controlled by link 438. More specifically lever 452 carries a roller 456 engaging in an elongated closed slot 458 in the upper end of link 438.

The positioning of lever 428 when the carriage is in the rear or non-aligning position is controlled by a stationary cam 460. Cam 460 has a first cam surface 462 and a second relatively higher cam surface 464. As the carriage moves rearwardly, roller 432 leaves the lower cam position of lever 452 and passes on to cam surface 462 and then on to cam surface 464. Lever 452 is normally spring urged to the upper or dashed position as viewed in FIGURE 15.

Clutches 370, 392 and 412 are controlled through suitable mechanisms (not shown) by cams in the cam box 336.

A detailed description of the indent finding, aligning and coring operations will now be given. At the beginning of the processing of a fruit such as apple 44, cup beam 130 is being lowered and is approaching the lowermost position as illustrated in FIGURES 1, 4, 7 and 13(a) by moving shaft 338 to its farthest clockwise position. This causes cup 42 to be raised upwardly with respect to disc 76 to the position shown in solid lines in FIGURE 4 of the drawings by engagement of stem 62 against the cam 114. Cam 114 is adjusted to accommodate the size of fruit to be processed.

An apple 44 is fed down chute 40 as the cup beam 130 approaches its lowermost position. The aligning disc 76 is rotating as apple 44 enters cup 42. In most instances neither of the indents of the apple 44 fall upon the aligner disc 76. After apple 44 contacts the rotating outer surface 78 of disc 76, the frictional contact between surface 78 and the surface 52 of apple 44 imparts a force to apple 44 tending to cause rotation thereof. The component of movement of surface 78 caused by rotation of disc 76 about a horizontal axis applies a force to apple 44 tending to rotate apple 44 about a horizontal axis passing therethrough and in general alignment with a line parallel to the axis of rotation of disc 76. The movement of disc 76 about a vertical axis caused by the turning of shaft 82 about a vertical axis passing through substantially the center thereof also imparts through surface 78 to apple 44 a force tending to rotate apple 44 about a vertical axis. Because of irregularities in the surface of apple 44 and in addition because of the selected shape of the wall 58 of cup 42, apple 44 tends to be rolled around upon disc 76. The inclined wall 58 of cup 42 continually maintains apple 44 in contact with the moving surface 78 of disc 76.

Because of the continual shifting of disc 76 about a vertical axis, the force applied thereby to apple 44 is being continually applied in a different direction. In general apple 44 is continually rotating about a horizontal axis but the horizontal axis of rotation is also continually being changed because of the rotation of aligner 76 about a vertical axis. By this series of constantly changing impacts applied to apple 44, a large number of points of the surface 52 including the indents 46 and 54 are presented to the surface 78 of aligner disc 76. It is believed that the continual turning of the axis of rotation of disc 76 about a vertical axis together with the inclined walls 58 of cup 42 permits a maximum number of points of the surface of apple 44 to be presented to aligner disc 76 during any given time interval.

When one of the indents, either the stem indent or the blossom indent, of apple 44 is positioned toward disc 76, the shields 252 and 254 entering the indent prevent the surface 78 of disc 76 from moving out of that indent in apple 44. Accordingly, no additional driving force is applied to apple 44 and apple 44 comes to rest with the indent such as indent 54 positioned over disc 76. Apple 44 is now supported by the shields 252 and 254 and a point of contact with wall 58 of cup 42.

After a predetermined period of time, rotation of disc 76 is stopped by disengaging the clutch 370. Clutch 412 is next engaged whereby to cause rotation of shaft 152, shaft 170, sleeve 178 and the eccentric wiggler tip 194. The aligning and coring assemblies 24 are then moved over associated cups 42 and lever 218 is moved downwardly whereby to move the tip 194 downwardly toward apple 44. As is best illustrated in FIGURE 5 of the drawings, with one indent found, the apple 44 is supported by cup 42 in a position such that the upper indent 46 (here illustrated as the stem indent but it is to be understood that it could also be the blossom indent) is positioned at a point removed from a vertical line passing through the lower found indent resting over disc 76. The tip 194 is eccentrically positioned with respect to the center of the mount therefor so that the rounded end 198 describes an orbit or path which is circular when projected on a horizontal plane. In aligning apples having a diameter of from 2¼ to 4¾ inches the diameter of tip 194 is chosen to be approximately 0.185 inch and the vertical center axis thereof describes in a horizontal plane a circle having a radius of 0.062 inch.

With the parts having dimensions as described above, it has been found that some portion of the orbit of tip 194 falls within the upper indent such as indent 46 so that as the tip 194 is lowered end 198 contacts the concavely curved indent surface 50 at one point during rotation or orbiting of tip 194. Contact with concavely curved surface 50 combined with the pressure forcing tip 194 downwardly produces a resultant force tending to move the core axis of apple 44 into alignment between the end of tip 194 and the lower found indent. Accordingly, continued lowering of tip 194 serves to straighten or align the core axis of apple 44 between the tip 194 and the uppermost surfaces of shields 252—254.

In the event that first contact of end 198 with apple 44 falls on the general outer surface 52, a force is also applied tending to move the core axis of apple 44. As may be best seen from FIGURE 5 of the drawings this force in all cases will be applied in a direction tending to move apple 44 in a direction generally toward the point of contact thereof with cup 42. Accordingly, this force will actually be ineffectual to move the apple and instead tip 194 will be forced upwardly against the action of spring 200 (see FIGURE 9, also). This movement of tip 194 into the sleeve 178 permits rotation of sleeve 178 to continue without bruising or cutting the apple. The end 198 of tip 194 will ride upwardly along apple surface 52 until end 198 enters indent 46 and contacts surface 50 thereof. At this time spring 200 will urge tip 194 downwardly against surface 50 and a force will be exerted tending to move the core axis of apple 44 in a direction to permit further entry of tip 194 into indent 46. This serves to align the core axis between tip 194 and the shields 252—254 as has been explained above.

As the aligner shaft 170 approaches the lowermost position, indent aligner unit 22 begins to rise. More specifically, cup beam 130 is slowly raised by rotating shaft 338 in a counterclockwise direction as viewed in FIGURE 17. Because of the action of spring 118, aligner disc 76 and the associated parts mounted on bracket 70 rise before cup 42 begins to move. This insures that the aligned fruit is supported between disc 76 and tip 194. Alignment of the fruit is now complete, both indents having been found and the core axis moved to a substantially vertical position.

Continued upward movement of bracket 70 and disc 76 pushes tip 194 into sleeve 178 against the action of spring 200 and sleeve 178 is in turn pushed upwardly into the coring tube 234 first against the action of spring 188 and then against lever 218. At this time shaft 217 upon which lever 218 is mounted is free to rotate in a counterclockwise direction as viewed in FIGURES 1 and 2. After sleeve 178 has been moved upwardly into coring tube 234, the coring cutter 226 and more specifically the sharpened end 228 pierces and cuts the apple about the upper indent. Coring tube 234 is still being rotated by tube 152 which is in turn being driven through sprocket 156 by means of the drive chain 160. This provides a draw cut so that the flesh of the fruit is cleanly cut and not torn or bruised. The presence of the part-circular shields 252 and 254 (see particularly FIGURE 4) during the aligning and coring operations resists rotation of the fruit about a vertical axis. The fins 262 on outer tube 260 also enter apple 44 during the coring operation. As soon as fins 262 enter the apple, they also resist rotation of the apple about a vertical axis since sprocket 268 and the associated drive parts are stationary at this time.

The draw cut made by the coring cutter 226 reduces the pressure needed to perform the coring operation. It also prevents carrying of seeds through the fruit flesh and unnecessary bruising is avoided. Rotation of the coring cutter 226 also serves to cut off crooked stems which may have a portion thereof lying outside of the circumference of cutting edge 228. Crooked stems which are not so removed might interfere with subsequent fruit processing steps and particularly with a subsequent peeling operation.

Upward movement of bracket 70 carrying the fruit with it is continued until the upper surface of aligner disc 76 reaches a predetermined position. This insures that the cutting edge 228 of the cutter 226 is positioned at a fixed and predetermined distance from the lower end of all fruit regardless of size.

The carriage supporting the aligning and coring assemblies 24 is then moved rearwardly or to the right as viewed in FIGURES 1 and 16. Simultaneously bracket 70 carrying the aligner disc 76 and cup 42 begin moving downwardly carried by beam 130. This is accomplished by turning shaft 338 clockwise as viewed in FIGURE 16. When the lower end of stem 62 contacts cam 114, downward movement of cup 42 stops. Another apple to be aligned is then fed to cup 42 as bracket 70 and aligner disc 76 approach the lowermost position thereof.

Meanwhile the prior aligned and partially cored apple is carried upon outer tube 260 and fins 262. Movement of the carriage supporting these members rearwardly or to the right as viewed in FIGURES 1, 15 and 17 is accomplished by turning shaft 346 clockwise. Movement of these members is stopped when the partially cored apple is positioned above the lower coring tubes 306. Immediately after positioning of the partially cored apple above the associated coring member 306, bar 318 begins to move upwardly, this movement being accomplished by rotating lever 359 clockwise as viewed in FIGURE 17. Clutch 392 is energized and, accordingly, the impaling tube 260 is rotated through the drive linkage including universal 396, spline 400, universal 398, shaft 402, sprocket 404 and chain 282. As cutting edge 312 contacts the lower end of the rotating apple 44, a draw cut is made. Upward movement of bar 318 continues until cutting edge 312 reaches a point substantially positioned against cutting edge 228.

Shaft 217 is then rotated clockwise as viewed in FIGURES 2 and 17 to force shaft 170 downwardly. This movement of shaft 217 is obtained by further clockwise movement of lever 442 whereby to pull link 438 and the cam lever 452 downwardly. Downward movement of shaft 170 pushes the severed core from the apple and into the lower coring tube 306. The core is deflected out of the corer by means of the deflector 314 (see particularly FIGURE 12). This completes coring of the apple.

The apple is then transferred to the next fruit processing station (not shown). The carriage for aligner assemblies 24 is then returned to a position so that the upper indent aligners are in position above the associated cup 42. This movement of the carriage is accomplished by turning shaft 346 in a counterclockwise direction as viewed in FIGURE 17. An apple has had one of the indents thereof located by disc 76 during the coring operation described above and is now in a condition to have the upper indent thereof located and aligned by means of tip 194 and the associated parts. This completes an entire indent finding, core aligning and coring operation.

It will be seen that there has been provided a fruit preparation machine and method which fulfill all of the objects and advantages set forth above. Although a preferred embodiment including certain preferred dimensions thereof has been given for purposes of illustration, it is to be understood that various changes and modifications can be made therein without departing from the spirit and scope of the invention. Accordingly, the invention is to be limited only as set forth in the following claims.

I claim:

1. Apparatus for orienting fruit having two indents therein comprising a fruit support engageable in one indent of the fruit to support the fruit thereon, a finder element mounted above said fruit support for movement toward and away from said fruit support and fruit mounted thereon, and means to move said finder element in an orbit substantially less than the diameter of a fruit while moving said finder element into contact with the fruit, said orbit overlying at least a portion of the other indent of the fruit whereby said finder element enters the other indent to shift the fruit to seat the finder element in the other indent.

2. Apparatus for orienting apples having two indents therein disposed at opposite ends of the core axis comprising an apple support engageable in one indent of the apple to support the apple thereon, a finder element mounted above said apple support and movable toward and away from said apple support and an apple mounted thereon along a substantially vertical axis, drive mechanism to move said finder element about said vertical axis along a substantially circular path as said finder element is moved toward said apple support, and means resiliently mounting said finder element for movement vertically upon contact with an apple and resiliently urging said finder element toward an apple whereby to find the other indent of the apple and to align the core axis between said support and said finder element.

3. Apparatus for orienting apples having two indents therein comprising an apple support engageable in one indent of the apple to support the apple thereon, a shaft mounted above above said apple support withthe axis thereof disposed substantially vertically, afinder element, means resiliently mounting said finder element upon the lower end of said shaft, said mounting means including resilient means urging said finder element downwardly along the axis of said shaft, means driving interconnecting said finder element and said shaft to cause rotation of said finder element with said shaft, said finder element being mounted on said shaft at a point spaced laterally from the axis of rotation of said shaft, and means to rotate said shaft as said shaft is moved toward said apple support to find the other indent in the apple on said support.

4. An indent aligning member comprising a shaft adapted to be mounted for rotation about the longitudinal axis thereof, a tube slidingly mounted upon said shaft for movement in a direction parallel to the axis thereof, spring means urging said tube in a direction toward one end of said shaft, a positive drive connection between said shaft and said tube to rotate said tube with said shaft about the axis thereof, a finder element mounted on the free end of said tube and shiftable in a direction parallel to the axis thereof, spring means urging said finder element toward the free end of said tube, said finder element being mounted on said tube with the axis thereof spaced from the axis of rotation of said tube and said shaft, and a positive drive connection between said finder element and said tube whereby to move said finder element in a circular orbit when said tube and said shaft are rotated about the longitudinal axis thereof.

5. Apparatus for orienting apples having two indents therein comprising an apple receptacle having an aperture in the bottom thereof, an aligning disc mounted adjacent said receptacle and in vertical alignment with said aperture to support an apple in cooperation with said receptacle, means to rotate said aligning disc simultaneously about a substantially horizontal axis and a substantially vertical axis to find one indent in the apple and to position the one indent on said aligning disc, a finder element mounted above said receptacle and in alignment with said aligning disc, means to move said finder element in a closed orbit in a horizontal direction, and means to move said finder element toward said aligning disc after said disc has been positioned in one indent of the apple to find the other indent of the apple, and means to move said aligning disc vertically relative to said receptacle to lift the apple out of contact with receptacle and to align the apple along the axis interconnecting the indents thereof between said aligning disc and said finder element.

6. Appaartus for orienting apples having two indents therein disposed at opposite ends of the core axis of the apple comprising an apple receptacle having an aperture in the bottom thereof, an aligning disc positioned below said receptacle and in alignment with the aperture therein to support an apple in cooperation therewith, means simultaneously to rotate said aligning disc about a horizontal axis and about a vertical axis while in contact with an apple to find one indent therein, shields positioned adjacent said aligning disc on each side thereof to limit the area of contact between said aligning disc and an apple thereon, a finder element positioned vertically above said aligning disc, means to move said finding element in a circular orbit above an apple having one indent positioned on said aligning disc, means to move said finder element towards the apple while the finder element is moved in the orbit to find the other indent of the apple, and means to move said aligning disc and the apple thereon upwardly relative to said receptacle to align the core axis of the apple between said finder element and said aligning disc, said shields impeding rotation of the apple about a vertical axis when the finder element is in contact therewith.

7. Apparatus for preparing apples having two indents therein disposed at opposite ends of the core axis of the apple comprising an apple receptacle having an aperture in the bottom thereof, an aligning disc positioned below said receptacle and in alignment with the aperture therein to support an apple in cooperation therewith, means simultaneously to rotate said aligning disc about a horizontal axis and about a vertical axis while in contact with an apple to find one indent therein, shields positioned adjacent said aligning disc on each side thereof to limit the area of contact between said aligning disc and an apple thereon, a carriage mounted above said receptacle for movement to one position above said receptacle and to a second position removed from said receptacle, a finder element mounted upon said carriage above said aligning disc adapted in said one position to overlie said aligning disc, means to move said finder element in a circular orbit about said vertical axis above an apple having one indent positioned on said aligning disc, means to move said finder element toward the apple while the finder element is moved in the orbit to find the other indent of the apple, means to move said aligning disc and the apple thereon upwardly relative to said receptacle to vertically align the core axis of the apple between said finder element and said aligning disc, a corer mounted upon said carriage in alignment with said vertical axis, and means to rotate said corer about said vertical axis while upward movement of said aligning disc moves the apple into contact with said corer, said shields resisting rotation of the fruit during the finding of the other indent and during coring.

8. Apparatus for preparing apples having two indents therein disposed at opposite ends of the core axis of the apple comprising an apple receptacle having an aperture in the bottom thereof, an aligning disc positioned below said receptacle and in alignment with the aperture therein to support an apple in cooperation therewith, means simultaneously to rotate said aligning disc about a horizontal axis and about a vertical axis while in contact with an apple to find one indent therein, shields positioned adjacent said aligning disc on each side thereof to limit the area of contact between said aligning disc and an apple thereon, a carriage mounted above said receptacle for movement to one position above said receptacle and to a second position removed from said receptacle, a finder element mounted upon said carriage above said aligning disc adapted in said one position to overlie said aligning disc, means to move said finder element in a circular orbit about said vertical axis above an apple having one indent positioned on said aligning disc, means to move said finder element toward the apple while the finder element is moved in the orbit to find the other indent of the apple, means to move said aligning disc and the apple thereon upwardly relative to said receptacle to vertically align the core axis of the apple between said finder element and said aligning disc, a first corer mounted upon said carriage in alignment with said vertical axis and for movement downwardly with the carriage relative to the finder element, an impaling blade mounted adjacent said first corer, said means to move said aligning disc upwardly forcing said first corer into the apple and impaling the apple upon said impaling blade, a second corer positioned beneath the second position of said carriage, means to move said second corer upwardly into the apple on said impaling blade when said carriage is in said second position, said second corer having a core ejection aperture formed therein, and means to move said finder element downwardly relative to the first corer to push the severed core of the apple outwardly through said core ejection aperture.

9. Apparatus for orienting fruit having two indents therein comprising a support, a first indent finder on said support, means to confine the fruit on said finder, means operatively connected to the first finder and the fruit confining means to rotate the confining means and said first indent finder relatively until one indent registers with said first finder, a second indent finder on said support and operatively associated with the first finder, means operatively connected to the second finder and the fruit confining means to shift the fruit laterally relative to said second indent finder until the other indent registers with said second indent finder.

10. Apparatus for orienting fruit having two indents therein comprising a support, an indent finder disc on said support, means on said support for confining fruit in contact with said disc, means on said support to rotate and revolve said disc simultaneously about a vertical axis and a horizontal axis while held in contact with the fruit by said fruit confining means until said disc registers with one indent of the fruit, a second indent finder on said support, and means on said support to shift said second indent finder laterally relative to said vertical axis until the second indent finder registers with the other indent of the fruit.

11. Apparatus for orienting fruit having two indents therein comprising a support, an indent finder disc on the support, means on the support to confine fruit in contact with the disc, means on the support to rotate and revolve said disc simultaneously about a vertical axis and a horizontal axis while the fruit is held in contact with the disc by said fruit confining means until the disc registers with one indent of the fruit, an indent finder pin on said support, and means on said support and operatively connected to said indent finder pin for moving said pin in an orbit about said vertical axis while in contact with the fruit in the confining means until said pin registers with the other indent of the fruit.

12. Apparatus for orienting indented fruit comprising a support, a fruit retaining member on said support, a rotatable disc mounted on said support in position to contact a fruit retained by said member, and means on said support operatively connected to said disc for rotating and revolving said disc simultaneously about a substantially horizontal axis and about a substantially vertical axis to impart rotating movement to the fruit until the disc registers with an indent therein.

13. Apparatus for orienting apples comprising a support, a receptacle on said support and having upwardly and outwardly inclined walls and an aperture at the bottom thereof, a substantially horizontal spindle on said support and extending beneath said receptacle, a rotatable disc mounted on said spindle beneath said receptacle and in alignment with said aperture to contact an apple positioned in said receptacle, and drive mechanism on said support operatively connected to said disc and said spindle to rotate said disc about a horizontal axis and simultaneously to shift said disc and the spindle about a vertical axis.

14. Apparatus for orientating apples comprising a support, an apple receptacle on said support, said receptacle having a frusto-conical fruit supporting surface extending upwardly and outwardly with the sides thereof disposed at approximately 45° with respect to the vertical axis of said receptacle, said receptacle having an aperture in the bottom thereof, a shaft mounted on said support beneath said receptacle and extending perpendicularly to the axis of the receptacle and passing through the axis of said receptacle, a disc mounted upon said shaft for rotation therewith, and means on said support and operatively connected to said disc and said shaft to rotate said disc about the horizontal axis of said shaft and simultaneously to shift said disc and said shaft about the vertical axis of said receptacle.

15. Apparatus for orienting fruit having two indents therein comprising a frame, a fruit support on the frame and engageable in one indent of the fruit to support the fruit thereon, a finder element on the frame operatively associated with the fruit support and movable toward and away from said fruit support, means on the frame operatively connected to said finder element to move said finder element toward and away from said fruit support, and means on the frame operatively associated with said finder element moving means to revolve said finder element along a closed path having dimensions substantially less than the fruit indent as the finder element is moved into contact with the fruit whereby to shift the fruit until the finder element is seated in the other indent of the fruit.

References Cited in the file of this patent
UNITED STATES PATENTS

| | | |
|---|---|---|
| 1,480,819 | Forrester et al. | Jan. 15, 1924 |
| 2,238,970 | Carroll | Apr. 22, 1941 |

(Other references on following page)

UNITED STATES PATENTS

| | | | |
|---|---|---|---|
| 2,265,515 | Carroll | Dec. 9, | 1941 |
| 2,447,640 | Dunn | Aug. 24, | 1948 |
| 2,506,802 | Magnuson et al. | May 9, | 1950 |
| 2,568,947 | Carroll | Sept. 25, | 1951 |
| 2,572,773 | Slagle | Oct. 23, | 1951 |
| 2,683,477 | Altman | July 13, | 1954 |
| 2,687,206 | Carroll | Aug. 24, | 1954 |
| 2,740,441 | Coons | Apr. 3, | 1956 |
| 2,742,136 | Carroll | Apr. 17, | 1956 |
| 2,788,818 | Skog | Apr. 16, | 1957 |
| 2,946,361 | Skog et al. | July 26, | 1960 |